US008401834B2

(12) United States Patent
Van Geemert

(10) Patent No.: US 8,401,834 B2
(45) Date of Patent: Mar. 19, 2013

(54) COMPUTER IMPLEMENTED METHOD FOR MODELIZING A NUCLEAR REACTOR CORE AND A CORRESPONDING COMPUTER PROGRAM PRODUCT

(75) Inventor: Rene Van Geemert, Erlangen (DE)

(73) Assignee: Areva NP, Courbevoie (FR)

( * ) Notice: Subject to any disclaimer, the term of this patent is extended or adjusted under 35 U.S.C. 154(b) by 165 days.

(21) Appl. No.: 12/857,164

(22) Filed: Aug. 16, 2010

(65) Prior Publication Data

US 2011/0046930 A1 Feb. 24, 2011

(30) Foreign Application Priority Data

Aug. 18, 2009 (EP) .................................. 09305766

(51) Int. Cl.
*G06F 7/60* (2006.01)
*G06F 17/50* (2006.01)
*G06G 7/48* (2006.01)
*G06G 7/54* (2006.01)

(52) U.S. Cl. .................................. 703/18; 703/2; 703/1
(58) Field of Classification Search .................. 703/1, 2, 703/18
See application file for complete search history.

(56) References Cited

U.S. PATENT DOCUMENTS

| | | | | |
|---|---|---|---|---|
| 5,267,276 A * | 11/1993 | Vujic | ............................. | 376/215 |
| 6,120,548 A * | 9/2000 | Jarvis et al. | ........................ | 703/2 |
| 6,795,801 B1 * | 9/2004 | Watkins et al. | .................... | 703/6 |
| 7,197,404 B2 * | 3/2007 | Holland | ........................... | 702/28 |
| 7,222,061 B2 * | 5/2007 | Russell et al. | ................... | 703/18 |
| 7,428,479 B2 * | 9/2008 | Boer et al. | ........................ | 703/2 |
| 7,461,038 B2 * | 12/2008 | Kropaczek et al. | ............. | 706/19 |
| 7,685,079 B2 * | 3/2010 | Watford et al. | .................. | 706/19 |
| 8,145,459 B2 * | 3/2012 | Holland | ............................ | 703/5 |
| 2005/0192764 A1 * | 9/2005 | Holland | ........................... | 702/28 |
| 2006/0184286 A1 | 8/2006 | Boer et al. | | |

FOREIGN PATENT DOCUMENTS

EP 2091049 a1 8/2009

OTHER PUBLICATIONS

Kaushik et al. "Enabling High Fidelity Neutron Transport Simulations on Petascale Architectures", Apr. 2009.*
Geemert, Rene. "Synergies of Acceleration Methodologies for Whole-Core N/TH-Coupled Steady-State and Transient Computations", PHYSOR-2006, ANS Topical Meeting on Reactor Physics.*
Adams et al. "Parallel Multigrid Smoothing: Polynomial Versus Gauss-Seidel", 2005.*
Chang et al. "Spatial Multigrid for Isotropic Neutron Transport", SIAM Journal on Scientific Computing, May 30, 2006.*
Clouse et al. "Parallel Deterministic Neutron Transport with AMR", Computational Method in Transport Workshop 2005.*

(Continued)

*Primary Examiner* — Shambhavi Patel
(74) *Attorney, Agent, or Firm* — Davidson, Davidson & Kappel, LLC

(57) ABSTRACT

A computer implemented method for modelizing a nuclear reactor core, including the steps of: partitioning the core in cubes to constitute nodes of a grid for computer implemented calculation, calculating neutron flux by using an iterative solving procedure of at least one eigensystem, the components of an iterant of the eigensystem corresponding either to a neutron flux, to a neutron outcurrent or to a neutron incurrent, for a respective cube to be calculated.
The neutrons are sorted in a plurality of neutron energy groups, and the eigensystem iterative solving procedure includes a substep of conditioning the eigensystem into a restricted eigensystem corresponding to the eigensystem for a selection of some neutron energy groups.

14 Claims, 4 Drawing Sheets

OTHER PUBLICATIONS

DeHart et al. "A Discrete Ordinates Approximation to the Neutron Transport Equation Applied to Generalized Geometries", Dec. 1992.*

Hamilton et al. "A Davidson Method for the k-Eigenvalue Problem", 2011.*

Damian et al. "Multilevel Transport Solution of LWR Reactor Cores", Sep. 2008.*

Kaushik et al. "Enabling High Fidelity Neutron Transport Simulations on Petascale Architectures", 2009.*

Damian, Jose. "Multilevel Acceleration of Neutron Transport Calculations", Dec. 2007.*

Rabiti et al. "The Method of Characteristics for the Neutron Transport Equation", 2006.*

Wang, Yaqi. "Adaptive Mesh Refinement Solution Techniques for the Multigroup SN Transport Equation Using a Higher-Order Discontinuous Finite Element Method", May 2009.*

Li et al. "Acceleration and Parallelization of the Method of Characteristics for Lattice and Whole-Core Heterogeneous Calculations", 2000.*

Böer et al., "The coupled neutronics and thermal hydraulics code system PANBOX for PWR safety analysis," Carl Hanser Verlag, vol. 57, No. 1, 1992 pp. 49 to 54.

Gupta et al., "Nodal Methods for Three-Dimensional Simulators," Progress in Nuclear Energy, vol. 7, No. 3, 1981, pp. 127-149.

Meurant et al.,"Iterative Methods for Multiprocessor Vector Computers," Computer Physics Reports vol. 11, No. 1-6, 1989, pp. 51-80.

* cited by examiner

COMPUTER IMPLEMENTED METHOD FOR MODELIZING A NUCLEAR REACTOR CORE AND A CORRESPONDING COMPUTER PROGRAM PRODUCT

This application claims priority to European application EP09305766.9, filed on Aug. 18, 2009, the entire disclosure of which is incorporated by reference herein.

The invention relates to a method for modelizing the core of a nuclear reactor, especially for calculating neutron flux within the core.

BACKGROUND

The results of such a modelizing method can be used to prepare safety analysis reports before building and starting a reactor.

These results can also be useful for existing nuclear reactors and especially for managing the nuclear fuel loaded therein. In particular, these results can be used to assess how the core design should evolve in time and decide of the positions of the fuel assemblies in the core, especially the positions of the fresh assemblies to be introduced in the core.

Such modelizing methods are implemented by computers. To this end, the core is partitioned in cubes, each cube constituting a node of a grid for implementing a digital computation.

Usually the steady-state diffusion equation to be solved during such a digital computation amounts to:

$$\underbrace{\Sigma_{Rg}^m \phi_g^m}_{removal} = \lambda \chi_g \sum_{g'=1}^{G} \underbrace{\nu \Sigma_{fg'}^m \phi_{g'}^m}_{production} + \sum_{g' \neq g}^{G} \underbrace{\Sigma_{gg'}^m \phi_{g'}^m}_{inscatter} + \sum_{u=x,y,z} \underbrace{\frac{1}{a_u^m} \theta_{gu}^m (j_{gul}^{+m} + j_{gur}^{-m})}_{incurrent}, \quad (1)$$

$$\text{with} \begin{cases} \Sigma_{Rg}^m = \Sigma_{ag}^m + \sum_{g' \neq g}^{G} \Sigma_{g'g}^m + \sum_{u=x,y,z} \frac{2c_{1gu}^m}{a_u^m} \\ \theta_{gu}^m = 1 - c_{2gu}^m - c_{3gu}^m, \end{cases} \quad (2)$$

where $\lambda$ is a first neutron eigenvalue, m is a cube index, also called nodal index, G is the number of neutron energy groups and g, g' are neutron energy group indexes, u is a Cartesian axis index of the cube, $\Sigma_{ag}^m$ represents macroscopic absorption cross-section for the cube m and the energy group g, $\Sigma_{fg'}^m$ represents macroscopic fission cross-section for the cube m and the energy group g', $\Sigma_{gg'}^m$ represents macroscopic slowing down cross-section for the cube m and the energy groups g, $\Phi_g^m$ represent neutron fluxes, such that the $\Sigma_{Rg}^m, \ldots \Phi_g^m$ represent the reaction rates for the corresponding reactions (absorption, fission), $\nu$ is the number of neutrons produced per fission, $\chi_g$ is the fraction of neutrons emerging from fission with neutron energy g, $a_u^m$ is the width of cube m along Cartesian axis u, and with the relationship between the neutron outcurrents $j_{gul}^{-m}$ and $j_{gur}^{+m}$, neutron fluxes $\Phi_g^m$ and neutron incurrents $j_{gul}^{+m}$ and $j_{gur}^{-m}$ defined by:

$$\begin{cases} j_{gul}^{-m} = c_{1gu}^m \phi_g^m + c_{2gu}^m j_{gul}^{+m} + c_{3gu}^m j_{gur}^{-m} \\ j_{gur}^{+m} = c_{1gu}^m \phi_g^m + c_{3gu}^m j_{gul}^{+m} + c_{2gu}^m j_{gur}^{-m} \end{cases} \quad (3)$$

The coefficients $c_{igu}^m$, with i=1, 2, 3, are characteristic of the cube m and depend on nodal dimensions and macroscopic cross-sections $\Sigma^m$.

FIG. 1 is a schematic representation in two dimensions of a cube m showing the neutron incurrents $j_{gul}^{+m}$ and $j_{gur}^{-m}$ for u=x, y and z; the neutron outcurrents $j_{gul}^{-m}$ and $j_{gur}^{+m}$ for u=x, y and z; and the neutron fluxes $\Sigma_g^m$. Indexes 1, respectively r, refers to each left interface surface, respectively each right interface surface, of the cube m for the respective Cartesian axis x, y. Indexes +, respectively −, represents the orientation from left to right, respectively from right to left, for the respective Cartesian axis x, y.

The steady-state diffusion equation (1) is also named NEM equation, for Nodal Expansion Method equation.

Both US Patent Publication 2006/01847286 and EP 2091049 teach a method for modelizing a nuclear reactor core via a computer.

In the state of the art methods, most of the computational efforts are concentrated in the part dedicated to the iterative solving of a large eigensystem corresponding to the steady-state diffusion equation (1).

In order to lower these computational efforts and therefore accelerate the solving of the eigensystem, Coarse Mesh Rebalancing (CMR) procedures have been used. In these procedures, neutron fluxes and currents for a given iteration are multiplied with a corrective factor before pursuing subsequent computationally expensive iterations. The multiplicative correction serves to suppress the presence of a non fundamental wavelength part of eigenspectrum with the first neutron eigenvalue $\lambda$ close to an exact value $\lambda_{exact}$.

However, the acceleration effect realized in this way depends on the numerical proximity of the highest coarse mesh level in a multi-level hierarchy to the full-core diffusion level. Such CMR procedures may therefore lead to very slow convergence or even convergence stagnation, thus increasing the computational effort.

SUMMARY OF THE INVENTION

An object of the present invention is to solve the above-mentioned problems by providing a nuclear reactor modelizing method which offers a better convergence accuracy, a better computational robustness and a better computational efficiency so that relevant neutron flux calculations can be obtained within a short computational time period and with a very good convergence accuracy.

The present invention provides a computer implemented method for modelizing a nuclear reactor core, comprising the steps of: partitioning the core in cubes (10) to constitute nodes of a grid (12) for computer implemented calculation, calculating neutron flux by using an iterative solving procedure of at least one eigensystem, the components of an iterant of the eigensystem corresponding either to a neutron flux, to a neutron outcurrent or to a neutron incurrent, for a respective cube (10) to be calculated, wherein the neutrons are sorted in a plurality of neutron energy groups, and wherein the eigensystem iterative solving procedure comprises a substep of conditioning the eigensystem into a restricted eigensystem corresponding to the eigensystem for a selection of some neutron energy groups.

The present invention also provides a computer program product residing on a computer readable medium and comprising computer program means for running on a computer implemented method.

BRIEF DESCRIPTION OF THE DRAWINGS

The invention will be better understood upon reading of the following description, which is given solely by way of example and with reference to the appended drawings, in which.

DETAILED DESCRIPTION

In the following description, the case of a pressurized water reactor (PWR) will be considered, but it should be kept in mind that the present invention applies to other types of nuclear reactors.

In a first step of the computer implemented modelizing method according to the invention, the core of the reactor is partitioned in cubes 10 (shown on FIG. 2) as in the state of art methods. Each cube 10 corresponds to a node of a grid or network 12 on which numerical computation will be implemented through the computer.

Figure 2:
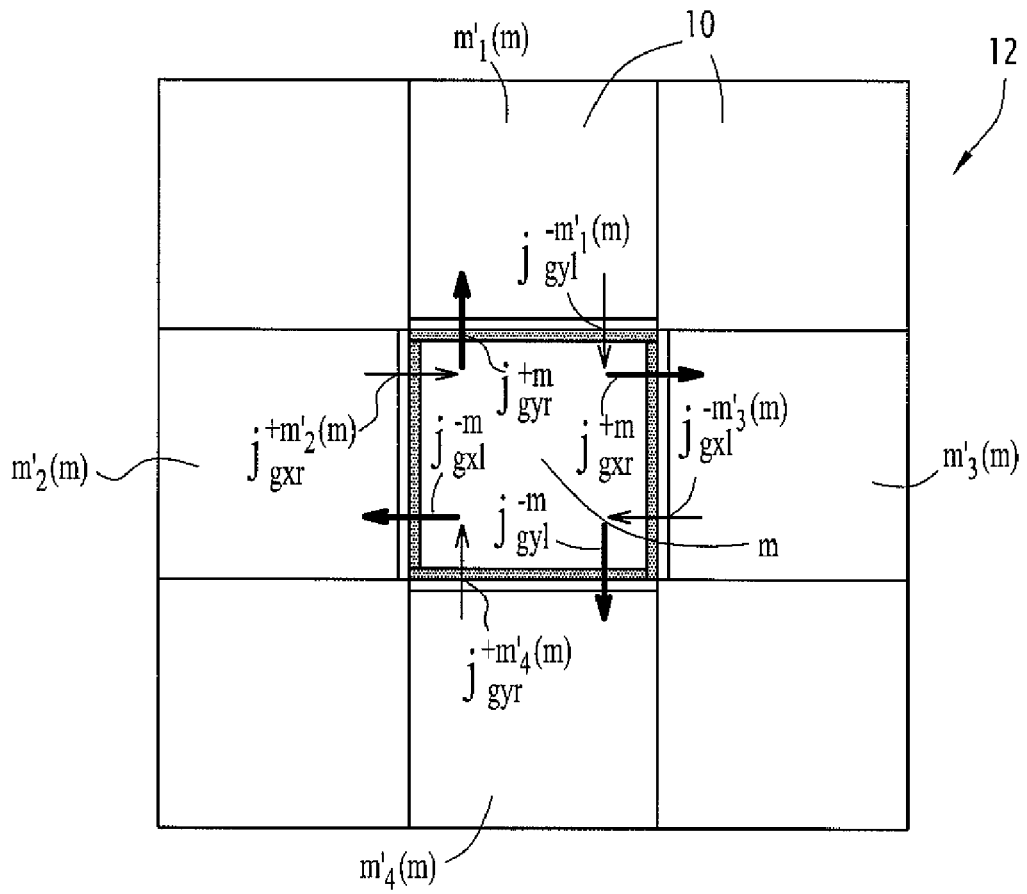
FIG. 2 is a schematic view illustrating the partitioning of a nuclear core, and the association of driving factors with interface surfaces of a cube according to an aspect of the present invention.

In order to ease the representation, the grid 12 is shown on FIG. 2 as being two-dimensional, but it should be kept in mind that the grid is actually three-dimensional in order to represent the whole core.

The neighbours of the cube 10 with the cube index m (in the center of FIG. 2) are the cubes 10 with the respective cube index $m'_1(m)$, $m'_2(m)$, $m'_3(m)$ and $m'_4(m)$. In the following of the description, the cubes 10 will be directly designated by their respective cube index.

In a second step of the computer implemented modelizing method according to the invention, the neutron fluxes $\Phi_g^m$ within the core will be calculated by the solving of an eigensystem corresponding to the steady-state diffusion equation (1). To this end, an iterative solving procedure is used.

A removal operator $\hat{R}$, an inscatter operator $\hat{S}$, a production operator $\hat{F}$, and an incurrent operator $\hat{G}$ are defined, from Equation (1), by:

$$\begin{cases} [\hat{R}\phi]_g^m = \left(\Sigma_{ag}^m + \sum_{g' \neq g}^{G} \Sigma_{g'g}^m\right)\phi_g^m \\ [\hat{S}\phi]_g^m = \sum_{g' \neq g}^{G} \Sigma_{gg'}^m \phi_{g'}^m \\ [\hat{F}\phi]_g^m = \chi_g \sum_{g'=1}^{G} \nu\Sigma_{fg'}^m \phi_{g'}^m \\ [\hat{G}J]_{gu}^m = \sum_{u=x,y,z} \frac{1}{a_u^m} \theta_{gu}^m (j_{gul}^{+m} + j_{gur}^{-m}) \end{cases} \quad (4)$$

An isotropic outcurrent generation operator $\hat{\Pi}$ and a monodirectional current throughflow operator $\hat{\Omega}$ are defined by:

$$\begin{cases} [\hat{\Pi}\phi]_{gu}^m = c_{1gu}^m \phi_g^m \\ [\hat{\Omega}J]_{gul}^{-m} = c_{2gu}^m j_{gul}^{+m} + c_{3gu}^m j_{gur}^{-m} \\ [\hat{\Omega}J]_{gur}^{+m} = c_{3gu}^m j_{gul}^{+m} + c_{2gu}^m j_{gur}^{-m} \end{cases} \quad (5)$$

A coupling operator $\hat{Y}$ couples the outcurrents to the incurrents for neighbouring cubes 10, and is defined by:

$$\begin{cases} j_{gul}^{+(m)} = [\hat{Y}J]_{gul}^{+(m)} = j_{gur}^{+(m-1)} \\ j_{gur}^{-(m)} = [\hat{Y}J]_{gur}^{-(m)} = j_{gul}^{-(m+1)} \\ j_{gul}^{-(m)} = [\hat{Y}J]_{gul}^{+(m)} = j_{gur}^{-(m-1)} \\ j_{gur}^{+(m)} = [\hat{Y}J]_{gur}^{-(m)} = j_{gul}^{+(m+1)}, \end{cases} \quad (6)$$

This coupling operator $\hat{Y}$ uses the fact that, for example, for a cube m, the u-directional left-oriented outcurrent equals the u-directional left-oriented incurrent for the left neighbour in direction of the Cartesian axis u, and that similar equalities are verified for the other directions and orientations. For example, the neutron outcurrents coming from respective neighbours $m'_1(m)$, $m'_2(m)$, $m'_3m)$, $m'_4(m)$ into the cube m are the neutron incurrents for the cube m, as the neighbours $m'_1(m)$, $m'_2(m)$, $m'_3m)$, $m'_4(m)$ shown in FIG. 2 are respectively the neighbours (m+1) for the Cartesian axis y, (m−1) for the Cartesian axis x, (m+1) for the Cartesian axis x and (m−1) for the Cartesian axis y of Equation (6).

Using the above operators, the equations (1) and (2) can be written as:

$$\begin{cases} \hat{R}\phi = (\lambda\hat{F} + \hat{S})\phi + \hat{G}j^{(in)} \\ j^{(out)} = \hat{\Pi}\phi + \hat{\Omega}j^{(in)} \\ j^{(in)} = \hat{Y}j^{(out)}, \end{cases} \quad (7)$$

or as:

$$\begin{pmatrix} \hat{R} - \hat{S} - \lambda\hat{F} & \hat{0} & \hat{G} \\ -\hat{\Pi} & \hat{1} & -\hat{\Omega} \\ \hat{0} & -\hat{Y} & \hat{1} \end{pmatrix} \begin{pmatrix} \phi \\ j^{(out)} \\ j^{(in)} \end{pmatrix} = \begin{pmatrix} 0 \\ 0 \\ 0 \end{pmatrix} \quad (8)$$

which is the eigensystem to be solved.

Figure 1:
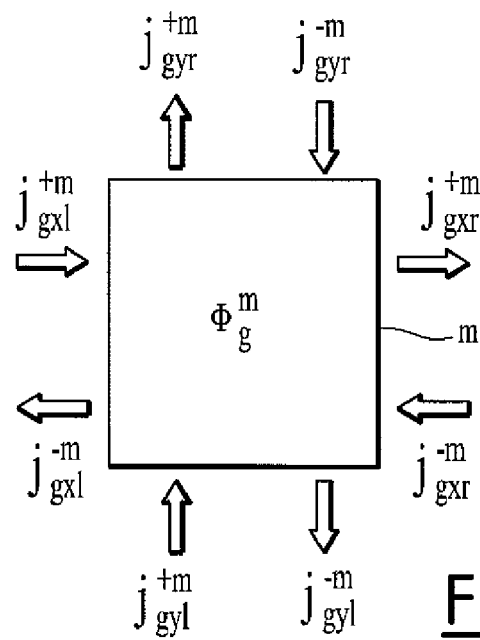
FIG. 1 is a classic representation of the relationship between macroscopic cross-sections, neutron incurrents, neutron fluxes and neutron outcurrents, in a modelized nuclear core reactor.

In Equation (8), $\Phi$ is a neutron flux column vector, wherein each element is a neutron flux $\Phi_g^m$ for a respective cube m and for a respective energy group g (FIG. 1). Thus, the dimensions of the neutron flux column vector $\Phi$ are equal to (G×M, 1), where G is the number of energy groups and M is the number of cubes 10. $j^{(out)}$ is a neutron outcurrent column vector, wherein each element is a respective neutron outcurrent $j_{gul}^{-m}$, $j_{gur}^{+m}$, for the respective cube m, energy group g and Cartesian axis u, with u equal to x, y or z. $j^{(in)}$ is a neutron incurrent column vector, wherein each element is a respective neutron incurrent $j_{gul}^{+m}$, $j_{gur}^{-m}$, for the respective cube m, energy group g and Cartesian axis u. Thus, the dimensions of the neutron outcurrent vector column $j^{(out)}$ and the neutron incurrent vector column $j^{(in)}$ are equal to (6×G×M, 1). In the following of the description, the neutron outcurrent vector column $j^{(out)}$ is also noted $j_{out}$.

Thus, the components of an iterant ($\Phi$, $j^{(out)}$, $j^{(in)}$) of the eigensystem defined by Equation (8) correspond to the neutron fluxes $\Phi_g^m$, the neutron outcurrents $j_{gul}^{-m}$, $j_{gur}^{+m}$, and the neutron incurrents $j_{gul}^{+m}$, $j_{gur}^{-m}$, to be calculated for each cube m and for each energy group g, and which are the respective elements of the neutron flux column vector $\Phi$ the neutron outcurrent column vector $j^{(out)}$ and the neutron incurrent column vector $j^{(in)}$.

The iterative solving procedure comprises a sub step of conditioning the eigensystem into a spare eigensystem wherein the components of an iterant ($j^{(out)}$, $j^{(in)}$) of the spare eigensystem only correspond either to the neutron incurrents $j_{gul}^{+m}$, $j_{gur}^{-m}$ coming into the respective cube m or to the neutron outcurrents $j_{gul}^{-m}$, $j_{gur}^{+m}$ coming from the respective cube m, which are the respective elements of the neutron outcurrent column vector $j^{(out)}$ and the neutron incurrent column vector $j^{(in)}$.

The conditioning of the eigensystem into a spare eigensystem starts from modifying the first part of Equation (8) written as:

$$\Phi\Phi$$

$$(\hat{R}-\hat{S}-\lambda\hat{F})\phi-\hat{G}j^{(in)}=0, \quad (9)$$

Defining the symbolic operator $\hat{P}_\lambda=(\hat{R}-\hat{S}-\lambda\hat{F})^{-1}$, the neutron flux column vector $\Phi$ is expressed in function of the neutron incurrent column vector $j^{(in)}$ as:

$$\phi=\hat{P}_\lambda\hat{G}j^{(in)} \quad (10)$$

By substituting this expression in the outcurrent equation part of Equation (7), i.e. in the second part of Equation (8), a currents-only relationship is obtained:

$$j^{(out)}=[\hat{\Pi}\hat{P}_\lambda\hat{G}+\hat{\Omega}]j^{(in)} \quad (11)$$

After defining the following operator notations:

$$\hat{\Theta}_\lambda=\hat{\Pi}\hat{P}_\lambda \quad (12)$$

and $$\hat{B}_\lambda=\hat{\Theta}_\lambda\hat{G}+\hat{\Omega}, \quad (13)$$

the currents-only relationship is written as:

$$j^{(out)}=\hat{B}_\lambda j^{(in)} \quad (14)$$

which is a spare eigensystem.

Using the relationship $j^{(in)}=\hat{Y}j^{(out)}$ between the neutron outcurrent column vector $j^{(out)}$ the neutron incurrent column vector $j^{(in)}$, where $\hat{Y}$ is the coupling operator, a spare eigensystem is obtained wherein the components of an iterant ($j^{(out)}$) of the spare eigensystem only correspond to the neutron outcurrents $j_{gul}^{-m}$, $j_{gur}^{+m}$ coming from the respective cube m, which are the elements of the neutron outcurrent column vector $j^{(out)}$. This spare eigensystem corresponds to:

$$[\hat{I}-\hat{B}_\lambda\hat{Y}]j^{(out)}=0 \quad (15)$$

Since the operator $\hat{B}_\lambda\hat{Y}$ will initially not be exactly equal to 1, and will become equal to 1 only as $j^{(out)}$ converges to the exact solution $j^{(out)}_{exact}$ and if simultaneously the first neutron eigenvalue $\mu$ converges to an exact value $\lambda_{exact}$, so that Equation (15) becomes:

$$[\hat{I}-\mu\hat{B}_\lambda\hat{Y}]j^{(out)}=0, \quad (16)$$

with a second neutron eigenvalue $\mu$ converging towards 1, if the first neutron eigenvalue $\lambda$ converges to the exact value $\lambda_{exact}$.

For numerical optimization, Equation (16) may be modified through a premultiplication with the operator $\hat{\Pi}^{-1}$ and the following equation is obtained:

$$\hat{\Pi}^{-1}j^{(out)}=\mu[\hat{P}_\lambda\hat{G}+\hat{\Pi}^{-1}\hat{\Omega}]\hat{Y}j^{(out)} \quad (17)$$

The term $\hat{P}_\lambda\hat{G}\hat{Y}j^{(out)}$ is an isotropic term, which does not depend on the Cartesian direction u.

The expressions of the respective terms from Equation (17) for the cube index m, Cartesian axes u, u' and the respective orientations s, s' along the Cartesian axes u, u' are given by:

$$\begin{cases} A_{mGus} = \sum_{g\in G} \left[\hat{\Pi}^{-1}j^{(out)}\right]_{mgus} \\ Q_{mG}^{G'u's'} = \sum_{g\in G}\sum_{g'\in G'} \left[\hat{P}_\lambda\hat{G}\hat{Y}j^{(out)}\right]_{mg}^{g'u's'} \\ C_{mGus}^{s'} = \sum_{g\in G} \left[\hat{\Pi}^{-1}\hat{\Omega}\hat{Y}j^{(out)}\right]_{mgus}^{s'} \end{cases} \quad (18)(19)(20)$$

G, G' are sets of energy groups. $\hat{A}$ and $\hat{C}$ are mono-energetic operators with their respective factors $A_{mGus}$ and $C_{mGus}^{s'}$. $Q_{mG}^{G'u's'}$ are the factors of a spectral operator $\hat{Q}_\lambda$. It should be noted that each combination {u, s}, respectively {u', s'}, defines an interface surface of the cube m with u, u' equal to x, y or z, and s, s' equal to 1 or r. For example, {x, 1} defines the left interface surface of the cube m along the Cartesian axis x.

The individual terms are given by:

$$\left[\hat{\Pi}^{-1}j^{(out)}\right]_{mgus} = \frac{1}{c_{1gu}^m}j^{(out)}_{mgus} \quad (21)$$

$$\left[\hat{P}_\lambda\hat{G}\hat{Y}j^{(out)}\right]_{mg}^{g'u's'} = \sum_{g'=1}^{ng} \hat{P}_{gg'}\left[\hat{G}\hat{Y}j^{(out)}\right]_{mgus}^{u's'} \quad (22)$$

$$= \sum_{g'=1}^{ng} \hat{P}_{gg'}\frac{1}{a_{u'}^m}\theta_{g'u'}^m j_{g'}^{m-\eta(mu's')}$$

$$\left[\hat{\Pi}^{-1}\hat{\Omega}\hat{Y}j^{(out)}\right]_{mgus}^{s'} = \frac{1}{c_{1gu}^m}[c_{2gu}^m\delta_{ss'} + c_{3gu}^m(1-\delta_{ss'})]j_g^{m-\eta(mus')} \quad (23)$$

Equation (17) is then solved, e.g. by using a conventional iterative solving procedure as a Gauss-Seidel procedure.

Thus, a solution is calculated for the elements $j^{(out)}_{mgus}$ of the neutron outcurrent column vector $j^{(out)}$. This enables to determine the solution of the neutron incurrent column vector $j^{(in)}$ according to Equation (14), and finally to determine the solution of the neutron flux column vector $\Phi$ according to Equation (10).

The calculated neutron flux column vector $\Phi$ obtained through the modelizing method can be used to control an existing nuclear reactor core, e.g. for managing the nuclear fuel, or be used for building a new reactor core.

The modelizing method may be implemented on parallel processors or on a single processor.

This above-disclosed modelizing method has proved to lead to better convergence accuracy, a better computational robustness and a better computational efficiency. This is connected to the solving of a sparse eigensystem wherein the only components of the iterant correspond to neutron outcurrents $j^{(out)}$, and do not depend on neutron fluxes.

Further, the convergence accuracy of the modelizing method according to the invention may be improved up to 1E-12, whereas the convergence accuracy obtained with a classic modelizing method is limited to 1E-6.

In other embodiments, the components of the iterant of the spare eigensystem to be solved correspond only to neutron incurrents $j^{(in)}$.

In order to further improve robustness and computational efficiency, according to a second aspect of the invention, the eigensystem is first conditioned in a restricted eigensystem corresponding to the eigensystem for a selection of some neutron energy groups. This selection is also called spectral restriction to some energy groups. The restricted eigensystem may then be solved according to the first aspect of the invention. Finally, the solution of the restricted eigensystem is used to solve the eigensystem.

The number NGC of the selected energy groups is smaller than the total number ng of energy groups. NGC may be the number of coarsened spectral bands which are collections of fine energy groups merged into a smaller number of coarse energy groups.

ng is, for example, equal to 8, and NGC may for example be equal to 4, 3, 2 or 1.

According to this second aspect, the Equation (17) for the driving factors $d_{Gmus}^{(out)}$, with its respective terms given by Equations (18) to (20), is expressed as:

$$\underbrace{A_{Gmus}^{(out)} d_{Gmus}^{(out)}}_{\text{"outflow"}} = \mu \left[ \underbrace{\sum_{G'=1}^{NGC} \sum_{u'=1}^{3} \sum_{s'=1,r} Q_{mG}^{G'u's'} d_{G'\eta(mu's')u's'}^{(out)}}_{\text{"isotropic production"}} + \underbrace{\sum_{s'=1,r} C_{mGus}^{s'} d_{Gmus'}^{(out)}}_{\text{"throughflow"}} \right] \quad (24)$$

where G, G' are coarse neutron energy group indexes, and in which an isotropic term $$\sum_{G'=1}^{NGC} \sum_{u'=1}^{3} \sum_{s'=1,r} Q_{mG}^{G'u's'} d_{G'\eta(mu's')u's'}^{(out)}$$

is independent of the outgoing current direction specified by the Cartesian axis u and orientation s, and a throughflow term $$\sum_{s'=1,r} C_{mGus}^{s'} d_{Gmus'}^{(out)},$$

also called anisotropic term, is defined within the same coarse neutron energy group G along the same Cartesian axis u.

Figure 3:
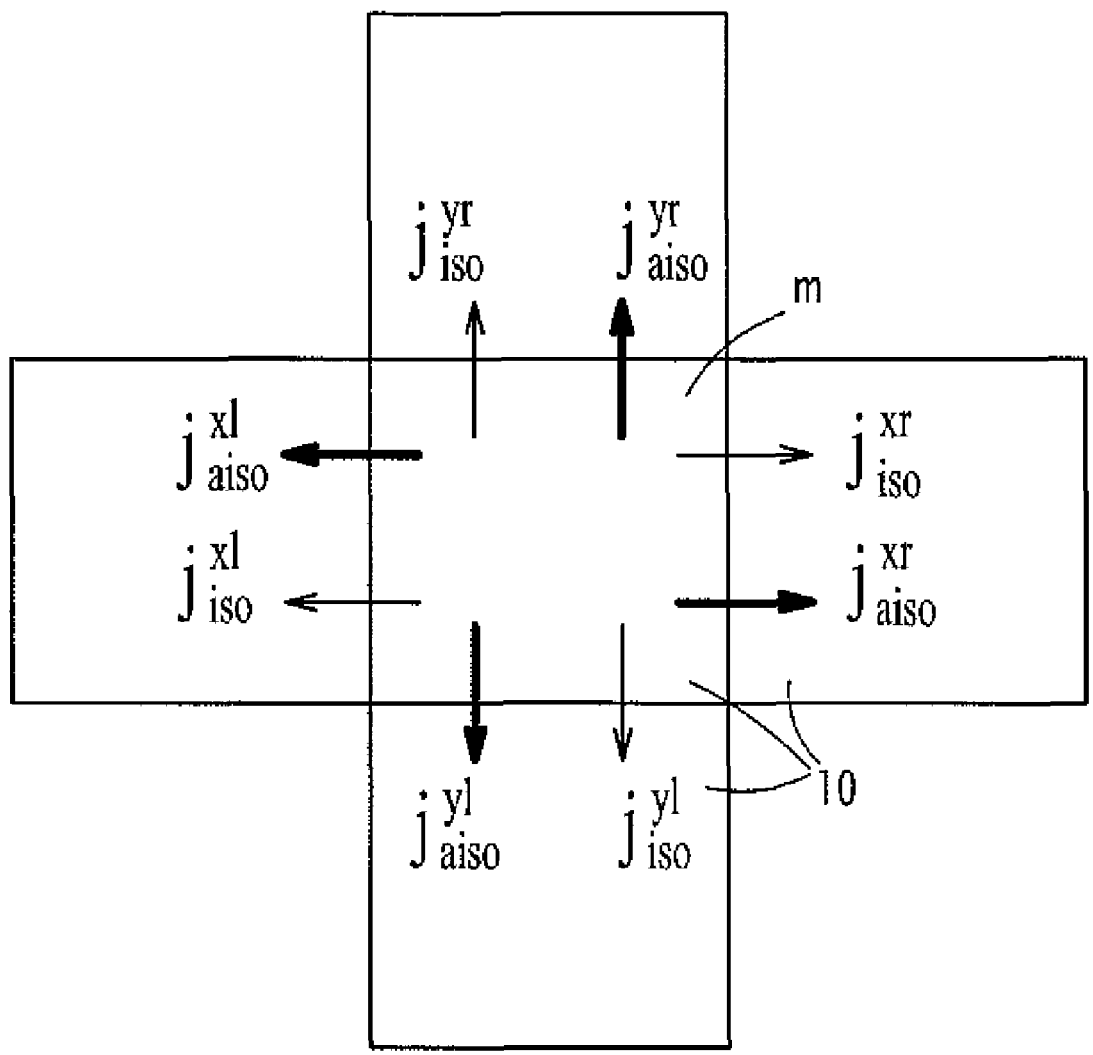
FIG. 3 is a schematic representation of the decomposition of isotropic and anisotropic parts of neutron outcurrents leaving the cube of FIG. 2.

The decomposition of the outcurrents leaving the cube m into isotropic and anisotropic terms is illustrated on FIG. 3.

The isotropic term is the same in all directions and the anisotropic term varies between interface surfaces of the cube m.

Solving at first the eigensystem for a spectral restriction to some energy groups, moreover with a decomposition of the outcurrents in which the isotropic term is computed easily, leads to a better computational robustness and a better computational efficiency. This is connected to the reduction of eigensystem dimensions that results from the spectral restriction according to this second aspect of the invention.

Figure 4:
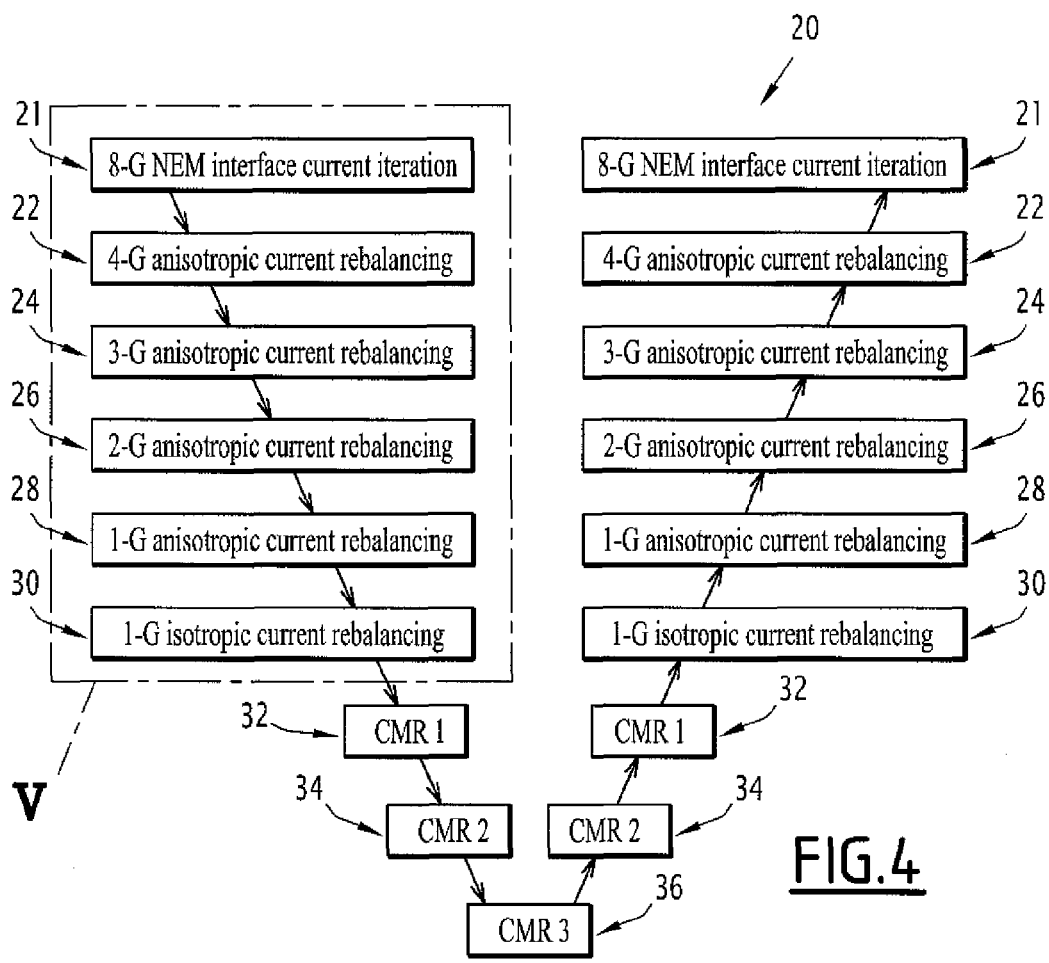
FIG. 4 is a schematic representation of a multi-level V-cycle from the iterative solving procedure according to another aspect of the present invention.

In order to further improve robustness and computational efficiency, according to a third aspect of the invention, the iterative solving procedure for a plurality of energy groups may be in form of a multi-level V-cycle 20, as shown on FIG. 4, comprising a top level 21, a first intermediate level 22, four second intermediate levels 24, 26, 28, 30, and three bottom levels 32, 34, 36.

The top level 21 of the V-cycle comprises the iteration for the eigensystem corresponding to the steady-state diffusion equation (1), or NEM equation, for the plurality of neutron energy groups, and the conditioning of the eigensystem into a restricted eigensystem for a spectral restriction to some energy groups according to the second aspect of the invention. The restricted eigensystem resulting from the top level 21 is then fed into a first intermediate level 22 just under the top level 21.

The first intermediate level 22 comprises the conditioning of the restricted eigensystem into a spare eigensystem according to the first aspect of the invention wherein the components of an iterant ($j^{(out)}$, $j^{(in)}$) of the spare eigensystem only correspond either to neutron incurrents $j_{gul}^{+m}$, $j_{gur}^{-m}$ coming into the cubes m or to neutron outcurrents $j_{gul}^{-m}$, $j_{gur}^{+m}$, also noted $j^{(out)}_{mgus}$, coming from the cubes m. The factors of operators $\hat{A}, \hat{Q}_\lambda$ and $\hat{C}$ given by Equations (18) to (20) are computed explicitly for this first intermediate level 22.

Each second intermediate levels 24, 26, 28, 30 comprises the conditioning of a former spare eigensystem for a former selection of neutron energy groups into a latter spare eigensystem for a latter selection of neutron energy groups, the number of neutron energy groups in said latter selection being smaller to the number of neutron energy groups in said former selection. The former spare eigensystem of the second intermediate level 24 subsequent to the first intermediate level 22 in the downward orientation of the multi-level V-cycle 20 is the spare eigensystem resulting from the first intermediate level 22. The former spare eigensystem of each second intermediate level 26, 28, 30 which is not subsequent to the first intermediate level 22 corresponds to the latter spare eigensystem resulting from the precedent second intermediate level 24, 26, 28. In other words, the number of neutron energy groups decreases from a second intermediate level to the next second intermediate level in the downward orientation. At the last second intermediate level 30, the number of neutron energy groups may be equal to 1. It should be noted that this restriction of the number of neutron energy groups for the second intermediate levels 24, 26, 28, 30 may be done according to a spectral condensation algebra, which will be described later, and not according to the second aspect of the invention.

Bottom levels 32, 34, 36 comprise, in the downward orientation of the V-cycle, the solving, according to state of the art procedures, of the last spare eigensystem for a single energy group determined at the last second intermediate level 30. Bottom levels 34, 36 correspond to a spatial restriction of the eigensystem resulting from the precedent bottom level 32, 34 in respective coarsened grids with cubes being larger than the cubes of the precedent bottom level 32, 34.

At the bottom level 36 of the V-cycle, a solution of the eigensystem for the single energy group is computed.

This solution is then reintroduced in the upper levels of the V-cycle in the upward orientation so that solutions are computed for the respective spare eigensystems.

At the top level 21 of the V-cycle in the upward orientation, the solution of the NEM equation for the plurality of energy groups is computed.

In the illustrated embodiment of FIG. 4, the number ng of neutron energy groups for the NEM equation at the top level 21 may be equal to 8. For the intermediate levels 22, 24, 26, 28, 30, the number of neutron energy groups in the respective selections may be respectively equal to four, three, two and one. The three bottom levels 32, 34, 36 of the V-cycle shown on FIG. 4 comprise the solving of said last spare eigensystem for said one energy group according to the CMR procedure.

Figure 5:
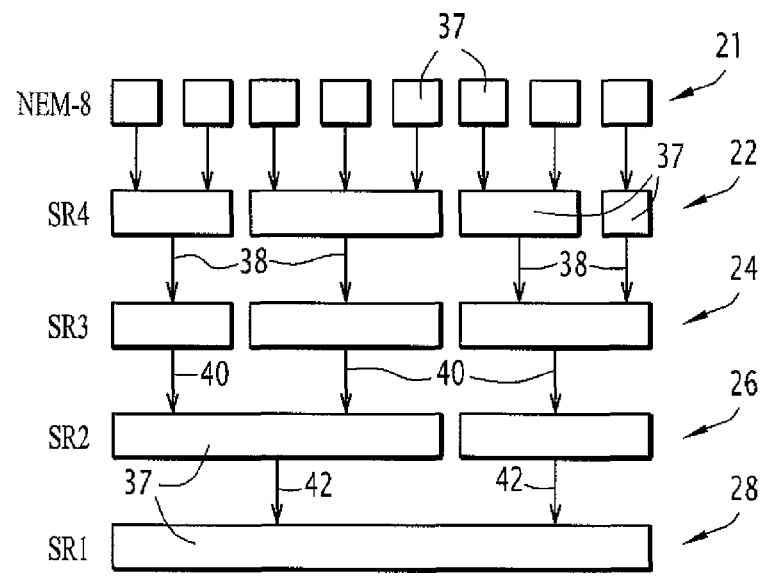
FIG. 5 is a detailed view of box V of FIG. 4.

The four intermediate levels 22, 24, 26, 28 corresponding to the solving of respective spare eigensystems are also designated by the respective references SR4, SR3, SR2 and SR1 (FIG. 5).

The factors of the mono-energetic operator $\hat{A}$ for the level SR4 are computed explicitly. Subsequently, the factors of the mono-energetic operator $\hat{A}$ for the level SR3 are derived from the ones for the level SR4, as shown on FIG. 5, where each box 37 represents a neutron energy group, through:

$$A_{m;SR3}^{1u's'} = A_{m;SR4}^{1u's'}$$

$$A_{m;SR3}^{2u's'} = A_{m;SR4}^{2u's'}$$

$$A_{m;SR3}^{3u's'} = A_{m;SR4}^{3u's'} + A_{m;SR4}^{4u's'} \tag{25}$$

Equation (25) is illustrated on FIG. 5 by the arrows 38 between levels 22 and 24.

Subsequently, the factors of the mono-energetic operator $\hat{A}$ for the level SR2 are derived from the ones for the level SR3 through:

$$A_{m;SR2}^{1u's'} = A_{m;SR3}^{1u's'} + A_{m;SR3}^{2u's'}$$

$$A_{m;SR2}^{2u's'} = A_{m;SR3}^{3u's'} \tag{26}$$

Equation (26) is illustrated on FIG. 5 by the arrows 40 between levels 24 and 26.

Finally, the factors of the mono-energetic operator $\hat{A}$ for the level SR1 are derived from the ones for the level SR2 through:

$$A_{m;SR1}^{u's'} = A_{m;SR2}^{1u's'} + A_{m;SR2}^{2u's'} \tag{27}$$

Equation (27) is illustrated on FIG. 5 by the arrows 42 between levels 26 and 28.

Equations (25) to (27) define a spectral condensation algebra for the mono-energetic operator $\hat{A}$ corresponding to a spectral grid partitioning strategy shown in FIG. 5. It should be noted that another spectral condensation algebra for the mono-energetic operator $\hat{A}$ with different equations may be defined with another spectral grid partitioning strategy, i.e. with a different arrangement of the boxes 37.

The factors of the mono-energetic operator $\hat{C}$ are derived in a similar manner as for the factors of the mono-energetic operator $\hat{A}$, from the level SR4 to the level SR1 in the downward orientation.

The factors of the spectral operator $\hat{Q}_\lambda$ for the level SR4 are computed explicitly. Subsequently, the factors of the spectral operator $\hat{Q}_\lambda$ for the level SR3 are derived from the ones for the level SR4 through:

$$Q_{m1;SR3}^{1u's'} = Q_{m1;SR4}^{1u's'}$$

$$Q_{m2;SR3}^{2u's'} = Q_{m2;SR4}^{2u's'}$$

$$Q_{m1;SR3}^{2u's'} = Q_{m1;SR4}^{2u's'}$$

$$Q_{m2;SR3}^{1u's'} = Q_{m2;SR4}^{1u's'}$$

$$Q_{m2;SR3}^{3u's'} = Q_{m2;SR4}^{3u's'} + Q_{m2;SR4}^{4u's'}$$

$$Q_{m3;SR3}^{2u's'} = Q_{m3;SR4}^{2u's'} + Q_{m4;SR4}^{2u's'}$$

$$Q_{m1;SR3}^{3u's'} = Q_{m1;SR4}^{3u's'} + Q_{m1;SR4}^{4u's'}$$

$$Q_{m3;SR3}^{1u's'} = Q_{m3;SR4}^{1u's'} + Q_{m4;SR4}^{1u's'}$$

$$Q_{m3;SR3}^{3u's'} = Q_{m3;SR4}^{3u's'} + Q_{m3;SR4}^{4u's'} + Q_{m4;SR4}^{3u's'} + Q_{m4;SR4}^{4u's'} \tag{28}$$

Subsequently, the factors of the spectral operator $\hat{Q}_\lambda$ for the level SR2 are derived from the ones for the level SR3 through:

$$Q_{m2;SR2}^{1u's'} = Q_{m3;SR3}^{1u's'} + Q_{m3;SR3}^{2u's'}$$

$$Q_{m1;SR2}^{2u's'} = Q_{m1;SR3}^{3u's'} + Q_{m2;SR3}^{3u's'}$$

$$Q_{m2;SR2}^{2u's'} = Q_{m2;SR3}^{2u's'}$$

$$Q_{m1;SR2}^{1u's'} = Q_{m1;SR3}^{1u's'} + Q_{m1;SR3}^{2u's'} + Q_{m2;SR3}^{1u's'} + Q_{m2;SR3}^{2u's'} \tag{29}$$

Finally, the factors of the spectral operator $\hat{Q}_\lambda$ for the level SR1 are derived from the ones for the level SR2 through:

$$Q_{m;SR1}^{u's'} = Q_{m1;SR2}^{1u's'} + Q_{m1;SR2}^{2u's'} + Q_{m2;SR2}^{1u's'} + Q_{m2;SR2}^{2u's'} \tag{30}$$

Equations (28) to (30) define a spectral condensation algebra for the spectral operator $\hat{Q}_\lambda$ corresponding to a spectral grid partitioning strategy not shown and similar to the one shown in FIG. 5 for the mono-energetic operators $\hat{A}$ and $\hat{C}$. It should be noted that another spectral condensation algebra for the spectral operator $\hat{Q}_\lambda$ may also be define with another spectral grid partitioning strategy.

Thus, a solution is calculated for the elements $j^{(out)}_{mgus}$ of the neutron outcurrent column vector $j^{(out)}$ at the top level 21 of the V-cycle in the upward orientation. This enables to determine the solution of the neutron incurrent column vector $j^{(in)}$ according to Equation (14), and finally to determine the solution of the neutron flux column vector $\Phi$ according to Equation (10).

The nuclear reactor core is then built or operated on the basis of the calculated neutron flux column vector $\Phi$.

Using spectral condensation algebras, wherein no complex arithmetic operation is involved, for the operators $\hat{A}$, $\hat{C}$ and $\hat{Q}_\lambda$ at the respective levels SR3, SR2 and SR1 allows the operators $\hat{A}$, $\hat{C}$ and $\hat{Q}_\lambda$ to be computed very cheaply, thus leading to a better computational robustness and a better computational efficiency of the modelizing method.

In order to further improve robustness and computational efficiency, according to a fourth aspect of the invention, the cubes 10 are split into a first category and a second category.

In the following description and as shown on FIG. 6, the cubes 10R of the first category will be called the red cubes and the cubes 10B of the second category will be called the black cubes but no specific restrictive meaning should be associated with the words "black" and "red". Each red cube 10R has only black cubes 10B as direct neighbours. Thus, most of the red cubes 10R have six direct black neighbours 10B. It should be understood by "direct" neighbours, the cubes sharing a common surface with the considered cube.

Figure 6:
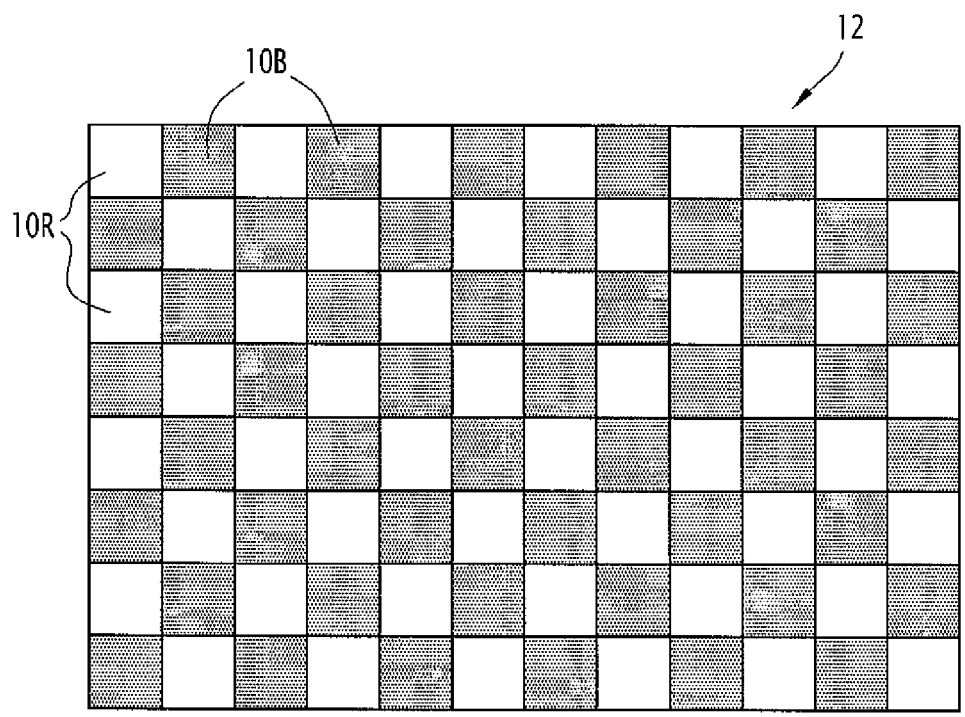
FIG. 6 is a schematic view illustrating the partitioning of a nuclear core according to another aspect of the invention.

Consequently, and as illustrated by FIG. 6, the grid 12 has a visual analogy with respect to the dark and light regions of a checkerboard in a two-dimensional representation.

Then, the cubes are numbered, starting for example by the red cubes 10R and ending by the black cubes 10B.

In the following description, such a split of the cubes in two categories and the numbering of one category after the other will be referred to as red-black ordering.

An advantage of the red-black ordering of the cubes in comparison with the state of the art lexicographical ordering is that, for a red cube 1R, all its direct neighbours will be black, and vice versa.

The Equation (24), which the computer has to solve in order to calculate neutron flux within the core, can be written in the matrix-vector form:

$$\hat{A}\underline{d} = \mu[\hat{Q}_\lambda + \hat{C}]\underline{d} \tag{31}$$

Using a variable parameter γ, which value is typically comprised between 0.9 and 0.95, so that the product γμ forms a shift, an iteration of Equation (31) is written with the following shift-inverted implicit form:

$$[\hat{A} - \gamma\mu^{(n-1)}(\hat{Q}_\lambda + \hat{C})]\underline{d}^{(n)} = \underline{s}^{(n-1)} \quad (32)$$

where $\underline{s}^{(n-1)}$ is a source given by:

$$\underline{s}^{(n-1)} = (1-\gamma)\mu^{(n-1)}(\hat{Q}_\lambda + \hat{C})\underline{d}^{(n-1)} \quad (33)$$

The spectral operator $\hat{Q}_\lambda$ and the mono-energetic operator $\hat{C}$ are sparse, coupling red cubes 10R only to direct black neighbours 10B and vice versa. Thus, the red-black ordering enables the following convenient relationship between the red and the black parts of the equation:

$$\hat{A}\underline{d}_{red} - \gamma\mu^{(n-1)}(\hat{Q}_\lambda + \hat{C})\underline{d}_{black} = \underline{s}_{red}$$

$$\hat{A}\underline{d}_{black} - \gamma\mu^{(n-1)}(\hat{Q}_\lambda + \hat{C})\underline{d}_{red} = \underline{s}_{black} \quad (34)$$

Equation (34) is transformed into the following equivalent equation for the red solution part only:

$$\tilde{\Theta}_{red}\underline{d}_{red} = \tilde{\underline{s}}_{red} \text{ with } \begin{cases} \tilde{\Theta}_{red} = \hat{I} - (\gamma\mu^{(n-1)})^2[\hat{A}^{-1}(\hat{Q}_\lambda + \hat{C})]^2 \\ \tilde{\underline{s}}_{red} = \hat{A}^{-1}[\underline{s}_{red} + \gamma\mu^{(n-1)}\hat{A}^{-1}(\hat{Q}_\lambda + \hat{C})\hat{A}^{-1}\underline{s}_{black}] \end{cases} \quad (35)$$

From a calculation point of view, the use of a red-black ordering means that, during an iterative solving procedure if, in the first half of an iteration, the red components $\underline{d}_{red}$ of the iterant $\underline{d}$ are updated, then, during the second part of the iteration, all the black components $\underline{d}_{black}$ will be updated on the basis of the red components of their red neighbours $\underline{d}_{red}$. In other words, the value for each black cube 10B will be calculated on the basis of the values for all its direct red neighbours 10R.

Using the red-black ordering improves the computation of the operators $\hat{A}$, $\hat{C}$ and $\hat{Q}_\lambda$ described in the first, second or third aspects of the invention. Thus, the red-black ordering may be used in complement of the first, second or third aspects of the invention in order to improve the computational efficiency.

Such a red-black ordering proves to be especially useful when used with a particular solving procedure which constitutes a fifth aspect of the invention.

This procedure is a particular highly robust stabilized Bi-Conjugate Gradient Stabilized (Bi-CGStab) procedure. An adequate introductory description of this procedure can be found in the following references:
- Y. Saad, "Iterative Methods for Sparse Linear Systems", second edition, Society for Industrial and Applied Mathematics (SIAM) (2003);
- H. A. van der Vorst, "Bi-CGSTAB: a Fast and Smoothly Converging Variant of Bi-CG for the solution of nonsymmetric linear systems", SIAM J. Sci. Stat. Comput. 13(2), pp. 631-644 (1992), The Bi-CGStab procedure is derived from a minimization principle for a functional of $\underline{d}$, with given $\Theta$ and $\underline{s}$, for which stationarity applies with regard to small variations $\delta\underline{d}$ around the specific optimum $\underline{d}$ which satisfies, exactly, the linear system given by Equation (35), and for which the functional assumes a minimum value.

Thus, it is possible to define a solving procedure driven by the minimization of a functional rather than by more direct considerations on how to solve Equation (35) efficiently. The Bi-CGStab procedure follows from such a minimization principle, where the successive changes in the iterant are organized such that each change in the functional (which is like a Galerkin-weighted integrated residual) is orthogonal with respect to all of the preceding changes.

The particular Bi-CGStab procedure according to the fifth aspect of the invention is given below with solution vector $\underline{d}$, solution residual $\underline{r}$ (with $\underline{r} = \underline{s} - \Theta\underline{d}$) and auxiliary vector $\underline{r}^*$, $\underline{s}$ and $\underline{p}$, and with initial solution estimate $\underline{d}_0$:

$$\begin{cases} 1. \ r_0 := \tilde{s} - \Theta d_0, r^* = r_0 \\ 2. \ p_0 := r_0, \\ 3. \ \text{do } i = 0, 1, \ldots, N \\ 4. \ \alpha_i := \dfrac{(r^*, r_i)}{(r^*, \Theta p_i)}, \\ 5. \ s_i := r_i - \alpha_i \Theta p_i, \\ 6. \ \omega_i := \dfrac{(\Theta s_i, s_i)}{(\Theta s_i, \Theta s_i)}, \\ 7. \ d_{i+1} := d_i + \alpha_i p_i + \omega_i s_i, \\ 8. \ r_{i+1} := s_i - \omega_i \Theta s_i, \\ 9. \ \beta_i := \dfrac{(r^*, r_{i+1})\alpha_j}{(r^*, r_i)\omega_j}, \\ 10. \ p_{i+1} := r_{i+1} + \beta_{i+1}(p_i - \omega_i \Theta p_i) \\ 11. \ \text{end do} \end{cases} \quad (36)$$

The above Bi-CGStab sequence is truncated after N steps, with usually N<3.

For the Bi-CGStab procedure, the preconditioning is based on the shift-inverted implicit form of Equation (32), with typically 0.9<γ<0.95.

With this choice for the shift γμ, the operator s is guaranteed to remain nonsingular since, during the solution process, γμ will converge down to γ times the smallest possible eigenvalue of the system.

Solving Equation (32) is numerically equivalent to determining the flux distribution in a slightly subcritical system with a neutron source, which is a perfect scenario for deploying advanced preconditioned Krylov procedure.

Using the red-black ordering, Equation (32) is transformed into Equation (35) as above explained. The preconditioned system given by Equation (35) constitutes the sixth aspect of the invention.

Once Equation (35) has been solved through the Bi-CGStab procedure the black solution part is to be computed from the black part of Equation (34).

Use of this particular way of preconditioning, which means that the direct neutron interaction between neighboring (red vs. black) nodes, as projected onto the grid, is preincluded in the system to be solved, making the unity operator in Equation (35) more dominant since $$\|(\hat{A}^{-1}(\hat{Q}_\lambda + \hat{C}))^2\| < \|\hat{A}^{-1}(\hat{Q}_\lambda + \hat{C})\|, \quad (37)$$

given that $$\|\hat{A}^{-1}(\hat{Q}_\lambda + \hat{C})\| < 1 \quad (38)$$

This way of preconditioning manages to pre-include, at low computational cost, crucial information (or the major part of that information) with regard to the physical interactions between nodes that determine the spatial couplings and hence the solution of the equation.

In another embodiment, the iterative solving procedure is a Gauss-Seidel procedure, or an iterative procedure in the Kry lov subspace, such as a generalized minimal residual method, also abbreviated GMRES, or a plain Jacobi method.

According to a seventh aspect of the invention, a variational principle for improved eigenvalue computation will be described in the following description.

Equation (16) corresponding to the spare eigensystem, above described for the first, second or third aspect of the invention, is written in the following form, with the second neutron eigenvalue $\mu$ and the neutron outcurrent vector column $j_{out}$:

$$j_{out} = \mu \hat{\Pi} \hat{P}_\lambda \hat{G} \hat{Y} j_{out} + \hat{\Omega} \hat{Y} j_{out},$$

$$j_{out} = \mu c_1 \phi + \hat{\Omega} \hat{Y} j_{out} \tag{39}$$

where $c_1$ is another notation for the operator $\hat{\Pi}$ depending on the cube properties.

In what follows, we will assume that the first neutron eigenvalue $\lambda$ fulfills the role of a scalar control parameter. Using the property that the second neutron eigenvalue $\mu$ approaches unity if the total solution converges and thus stabilizes, the variational principle, or perturbation approach, comprises the varying the first neutron eigenvalue $\lambda$ to drive the second neutron eigenvalue $\mu$ towards 1 and to accelerate the convergence of the spare eigensystem solution. This variation of the first neutron eigenvalue $\lambda$ may be done prior to every iteration of the spare eigensystem, or prior to every second, third, fourth or fifth iteration of the spare eigensystem.

The variation of the first neutron eigenvalue $\lambda$ is an application of a variation $\delta\lambda$ to $\lambda$ such that $\lambda$ is driven to $\lambda+\delta\lambda$, which impacts the second neutron eigenvalue $\mu$ through a perturbed interface current equation:

$$j_{out} + \delta j_{out} = \left[(\mu+\delta\mu)\hat{\Pi}\left(\hat{P}_\lambda + \delta\lambda \frac{\partial \hat{P}_\lambda}{\partial \lambda}\right)\hat{G} + \hat{\Omega}\right]\hat{Y}(j_{out} + \delta j_{out}) \tag{40}$$

$$= (\mu+\delta\mu)c_1\left(\phi + \delta\lambda \frac{\partial \phi}{\partial \lambda}\right) + \hat{\Omega}\hat{Y}(j_{out} + \delta j_{out})$$

with the partial operator derivative:

$$\hat{\Pi}\frac{\partial \hat{P}_\lambda}{\partial \lambda}\hat{G}\hat{Y} j_{out} \equiv c_1 \frac{\partial \phi}{\partial \lambda} \tag{41}$$

As perturbations $\delta j_{out}$ are expected to be increasingly small during the iterative procedure, they are conveniently ignored in Equation (40), and the integration with an arbitrary adjoined weighting function $\omega^\dagger$ yields the following expression:

$$\delta\mu[\delta\lambda] \cong \frac{\langle \omega^\dagger | c_1\phi \rangle}{\left\langle \omega^\dagger \middle| c_1 \frac{\partial \phi}{\partial \lambda} \right\rangle} \delta\lambda \tag{42}$$

As the variation of the first neutron eigenvalue $\lambda$ is such that the second neutron eigenvalue $\mu$ is driven towards 1, i.e. that $\mu+\delta\mu$ is driven towards 1, the approximation $\delta\mu \equiv 1-\mu$ is imposed. With this approximation and the Equation (42), the following equation is obtained:

$$\delta\lambda \cong \frac{\langle \omega^\dagger | c_1\phi \rangle}{\left\langle \omega^\dagger \middle| c_1 \frac{\partial \phi}{\partial \lambda} \right\rangle}(1-\mu) \tag{43}$$

Using the equivalence $\mu c_1 \phi = j_{out} - \hat{\Omega}\hat{Y}j_{out}$, $\delta\lambda$ is given by:

$$\delta\lambda \cong \frac{\langle \omega^\dagger | j_{out} - c_1\phi + \hat{\Omega}\hat{Y}j_{out} \rangle}{\left\langle \omega^\dagger \middle| c_1 \frac{\partial \phi}{\partial \lambda} \right\rangle} = \frac{\langle \omega^\dagger | r_{out} \rangle}{\left\langle \omega^\dagger \middle| c_1 \frac{\partial \phi}{\partial \lambda} \right\rangle} \tag{44}$$

where $r_{out}$ represents the residual of the interface outcurrent balance equation, i.e. Equation (39), with the imposed target value for the second neutron eigenvalue $\mu$ equal to 1. The residual $r_{out}$ needs to be computed for each NEM iteration step in any case.

The first neutron eigenvalue $\lambda$, considered in this aspect as a scalar control parameter, is then updated such that:

$$\lambda^{(new)} = \lambda^{(prev)} + \frac{\langle \omega^\dagger | r_{out}^{(prev)} \rangle}{\left\langle \omega^\dagger \middle| c_1 \frac{\partial \phi}{\partial \lambda} \right\rangle}, \tag{45}$$

where $\lambda^{(prev)}$ and $\lambda^{(new)}$ are respectively the previous and the updated value of the first neutron eigenvalue $\lambda$.

For determining the partial operator derivative $$\frac{\partial \phi}{\partial \lambda}$$

and using Equation (7) for example, the neutron flux $\Phi$ is written:

$$\phi = (\hat{R} - \hat{S} - \lambda \hat{F})^{-1} \hat{G}\hat{Y} j_{out} \tag{46}$$

from which it follows that:

$$\frac{\partial \phi}{\partial \lambda} = \left[\frac{\partial}{\partial \lambda}(\hat{R} - \hat{S} - \lambda\hat{F})^{-1}\right]\hat{G}\hat{Y} j_{out} \tag{47}$$

An approximate derivative $$\frac{\partial \tilde{\phi}}{\partial \lambda}$$

is then computed by neglecting the upper-diagonal part of the matrix relative to the inscatter operator $\hat{S}$ such that $\hat{S} = \hat{S}_{LD}$, i.e. by neglecting the upscattering:

$$\frac{\partial \tilde{\phi}}{\partial \lambda} = \left[\frac{\partial}{\partial \lambda}(\hat{R} - \hat{S}_{LD} - \lambda\hat{F})^{-1}\right]\hat{G}\hat{Y} j_{out} \tag{48}$$

It should be noted that in many computational cases this is not even an approximation, but numerically exact if no upscattering is modeled.

It is assumed that:

$$\frac{\partial \phi}{\partial \lambda} \cong \frac{\partial \tilde{\phi}}{\partial \lambda} \qquad (49)$$

which will be sufficient for a successful application of the variational principle.

For computing $$\frac{\partial \tilde{\phi}}{\partial \lambda},$$

it is first written:

$$\hat{R} - \hat{S}_{LD} - \lambda \hat{F} = (\hat{R} - \hat{S}_{LD})(\hat{I} - \lambda(\hat{R} - \hat{S}_{LD})^{-1}\hat{F}) \qquad (50)$$

from which it follows that:

$$(\hat{R} - \hat{S}_{LD} - \lambda \hat{F})^{-1} = (\hat{I} - \lambda(\hat{R} - \hat{S}_{LD})^{-1}\hat{F})^{-1}(\hat{R} - \hat{S}_{LD})^{-1} \qquad (51)$$

Then defining an operator notation $\hat{B}$ with:

$$\hat{B} = (\hat{R} - \hat{S}_{LD})^{-1}\hat{F} \qquad (52)$$

and in order to implicitly compute $$\frac{\partial}{\partial \lambda}[\hat{I} - \lambda \hat{B}]^{-1},$$

the Taylor formula is applied to $\hat{I} - \lambda \hat{B}$:

$$[\hat{I} - \lambda \hat{B}]^{-1} = \hat{I} + \lambda \hat{B} + \lambda^2 \hat{B}^2 + \lambda^3 \hat{B}^3 + \ldots = \sum_{n=0}^{\infty} [\lambda \hat{B}]^n \qquad (53)$$

The Taylor expansion is rearranged as:

$$\hat{I} + [\hat{I} + \lambda \hat{B} + \lambda^2 \hat{B}^2 + \lambda^3 \hat{B}^3 + \ldots]\lambda \hat{B} = \hat{I} + [\hat{I} - \lambda \hat{B}]^{-1}\lambda \hat{B} \qquad (54)$$

By application of the chain rule to Equation (54), the derivative $$\frac{\partial}{\partial \lambda}[\hat{I} - \lambda \hat{B}]^{-1}$$

is given by:

$$\frac{\partial}{\partial \lambda}[\hat{I} - \lambda \hat{B}]^{-1} = [\hat{I} - \lambda \hat{B}]^{-1}\hat{B} + \left[\frac{\partial}{\partial \lambda}[\hat{I} - \lambda \hat{B}]^{-1}\right]\lambda \hat{B} \qquad (55)$$

which yields:

$$[\hat{I} - \lambda \hat{B}]\frac{\partial}{\partial \lambda}[\hat{I} - \lambda \hat{B}]^{-1} = [\hat{I} - \lambda \hat{B}]^{-1}\hat{B} \qquad (56)$$

The final expression that allows an efficient iterative scheme for determining the derivative $$\frac{\partial}{\partial \lambda}[\hat{I} - \lambda \hat{B}]^{-1}$$

is obtained by premultiplication of Equation (56) with $\hat{I} - \lambda \hat{B}$, which gives:

$$[\hat{I} - \lambda \hat{B}]^2 \frac{\partial}{\partial \lambda}[\hat{I} - \lambda \hat{B}]^{-1} = \hat{B} \qquad (57)$$

By writing $[\hat{I} - \lambda \hat{B}]^2 = \hat{I} - 2\lambda \hat{B} + \lambda^2 \hat{B}^2$, computation of $$\frac{\partial \tilde{\phi}}{\partial \lambda}$$

is obtained from:

$$[\hat{I} - 2\lambda \hat{B} + \lambda^2 \hat{B}^2]\frac{\partial \tilde{\phi}}{\partial \lambda} = s \qquad (58)$$

with the source term s defined by:

$$s = \hat{B}(\hat{R} - \hat{S}_{LD})^{-1}\hat{G}\hat{Y}j_{out} = (\hat{R} - \hat{S}_{LD})^{-1}\hat{F}(\hat{R} - \hat{S}_{LD})^{-1}\hat{G}\hat{Y}j_{out} \qquad (59)$$

In the case of two energy groups, Equation (58) is solved directly and analytically.

In the case of more than two energy groups, Equation (58) is solved iteratively, without exactness required in early iteration phases, through application of:

$$\left[\frac{\partial \tilde{\phi}}{\partial \lambda}\right]^{(new)} = s + 2\lambda \hat{B}\left[\frac{\partial \tilde{\phi}}{\partial \lambda}\right]^{(old)} - \lambda^2 \hat{B}^2 \left[\frac{\partial \tilde{\phi}}{\partial \lambda}\right]^{(old)}, \qquad (60)$$

where $$\left[\frac{\partial \tilde{\phi}}{\partial \lambda}\right]^{(old)}$$

and $$\left[\frac{\partial \tilde{\phi}}{\partial \lambda}\right]^{(new)}$$

are respectively the previous and updated values of the approximate derivative $$\frac{\partial \tilde{\phi}}{\partial \lambda}.$$

Early means about the first third up to the first half of the totally needed number of iteration steps.

It should be noted that the iterations from the computation of $$\frac{\partial \tilde{\phi}}{\partial \lambda}$$

can be abort rather early, since this variational approach needs only an approximate value of $$\frac{\partial \tilde{\phi}}{\partial \lambda}$$

to be useful.

Thus, this variational principle according to this seventh aspect of the invention is very effective, because the numerator $\langle \omega^\dagger | r_{out}^{(prev)} \rangle$ in Equation (45) becomes smaller and smaller upon convergence, whereas the denominator $$\left\langle \omega^\dagger \left| c_1 \frac{\partial \phi}{\partial \lambda} \right. \right\rangle$$

will converge rather quickly to an adequate value. In this seventh aspect, the numerator defines the driving principle since it converges towards zero.

Varying the first neutron eigenvalue λ according to Equation (45) drives the second neutron eigenvalue μ towards 1 and accelerates the convergence of the spare eigensystem solution. This variation of the first neutron eigenvalue λ may be done prior to every iteration of the spare eigensystem, or prior to every second, third, fourth or fifth iteration of the spare eigensystem.

Thus, the variational principle of the first neutron eigenvalue λ may be used in complement of the first, second or third aspects of the invention in order to improve the computational efficiency.

All the above mentioned products of this seventh aspect can be reduced to the black part of the grid 12 without losing numerical efficiency in the method, so that the red-black ordering above described in the fourth aspect of the invention may be used in complement of this seventh aspect.

According to an eighth aspect of the invention, the above described variational principle for the eigenvalue computation can be generalized for the computation of a control parameter being noted θ, that typically modulates the removal operator $\hat{R}$ given by Equation (4), the modulated removal operator being noted $\hat{R}_\theta$.

In the example of a modulation in all positions, the control parameter θ is the boron concentration. In the example of a modulation in selected positions, the control parameter θ is a parameter for controlling a rod insertion depth for a group of selected control rods.

It is assumed that $\hat{R} = \hat{R}_\theta$

Equation (16) is then written in the following form, with the second neutron eigenvalue μ:

$$j_{out} = \mu \hat{\Pi} \hat{P}_\theta \hat{G} \hat{Y} j_{out} + \hat{\Omega} \hat{Y} j_{out}$$

$$j_{out} = \mu c_1 \phi + \hat{\Omega} \hat{Y} j_{out} \tag{61}$$

with a symbolic spectral operator $\hat{P}_\theta$ defined by $$\hat{P}_\theta = (\hat{R}_\theta - \hat{S} - \hat{F})^{-1} \tag{62}$$

Using the property that the second neutron eigenvalue μ approaches unity if the total solution, including the correct value of the control parameter θ, converges and thus stabilizes, the variational principle, or perturbation approach, comprises varying the control parameter θ to drive the second neutron eigenvalue μ towards 1.

The variation of the control parameter θ is an application of a variation δθ to θ such that θ is driven to θ+δθ, which impacts the second neutron eigenvalue μ through a perturbed interface current equation:

$$j_{out} + \delta j_{out} = \left[ (\mu + \delta \mu) \hat{\Pi} \left( \hat{P}_\vartheta + \delta \vartheta \frac{\partial \hat{P}_\vartheta}{\partial \vartheta} \right) \hat{G} + \hat{\Omega} \right] \hat{Y} (j_{out} + \delta j_{out}) \tag{63}$$

$$j_{out} + \delta j_{out} = (\mu + \delta \mu) c_1 \left( \phi + \delta \vartheta \frac{\partial \phi}{\partial \vartheta} \right) + \hat{\Omega} \hat{Y} (j_{out} + \delta j_{out})$$

with the partial operator derivative:

$$\hat{\Pi} \frac{\partial \hat{P}_\vartheta}{\partial \vartheta} \hat{G} \hat{Y} j_{out} \equiv c_1 \frac{\partial \phi}{\partial \vartheta} \tag{64}$$

As perturbations $\delta j_{out}$ are expected to be increasingly small during the iterative procedure, they are conveniently ignored in Equation (63), and the integration with an arbitrary adjoined weighting function $\omega^\dagger$ yields the following expression:

$$\delta \mu [\delta \vartheta] \cong \frac{\langle \omega^\dagger | c_1 \phi \rangle}{\left\langle \omega^\dagger \left| c_1 \frac{\partial \phi}{\partial \vartheta} \right. \right\rangle} \delta \vartheta \tag{65}$$

As the variation of the control parameter θ is such that the second neutron eigenvalue μ is driven towards 1, i.e. that μ+δμ is driven towards 1, the approximation δμ≡1−μ is imposed. With this approximation and the Equation (65), the following equation is obtained:

$$\delta \vartheta \cong \frac{\langle \omega^\dagger | c_1 \phi \rangle}{\left\langle \omega^\dagger \left| c_1 \frac{\partial \phi}{\partial \vartheta} \right. \right\rangle} (1 - \mu) \tag{66}$$

Using the equivalence $\mu c_1 \phi = j_{out} - \hat{\Omega} \hat{Y} j_{out}$, δθ is given by:

$$\delta \vartheta \cong \frac{\langle \omega^\dagger | j_{out} - c_1 \phi + \hat{\Omega} \hat{Y} j_{out} \rangle}{\left\langle \omega^\dagger \left| c_1 \frac{\partial \phi}{\partial \vartheta} \right. \right\rangle} = \frac{\langle \omega^\dagger | r_{out} \rangle}{\left\langle \omega^\dagger \left| c_1 \frac{\partial \phi}{\partial \vartheta} \right. \right\rangle} \tag{67}$$

where $r_{out}$ represents the residual of the interface outcurrent balance equation, i.e. Equation (39), with the imposed target value for the second neutron eigenvalue μ equal to 1.

The control parameter θ is then updated such that:

$$\vartheta^{(new)} = \vartheta^{(prev)} + \frac{\langle \omega^\dagger | r_{out}^{(prev)} \rangle}{\left\langle \omega^\dagger \left| c_1 \frac{\partial \phi}{\partial \vartheta} \right. \right\rangle} \tag{68}$$

It is assumed that $$\frac{\partial \phi}{\partial \vartheta} \cong \frac{\partial \tilde{\phi}}{\partial \vartheta}$$

which will be sufficient for a successful application of the variational principle to the control parameter θ.

For computing $$\frac{\partial \tilde{\phi}}{\partial \vartheta},$$

the above described conditioning with application of the Taylor formula is also used in the same manner.

The eighth aspect of the invention offers the same advantages as the above described seventh aspect of the invention, and may be used in complement of the first, second or third aspects of the invention in a manner similar to that for the above described seventh aspect of the invention, in order to improve the computational efficiency.

Figure 7:
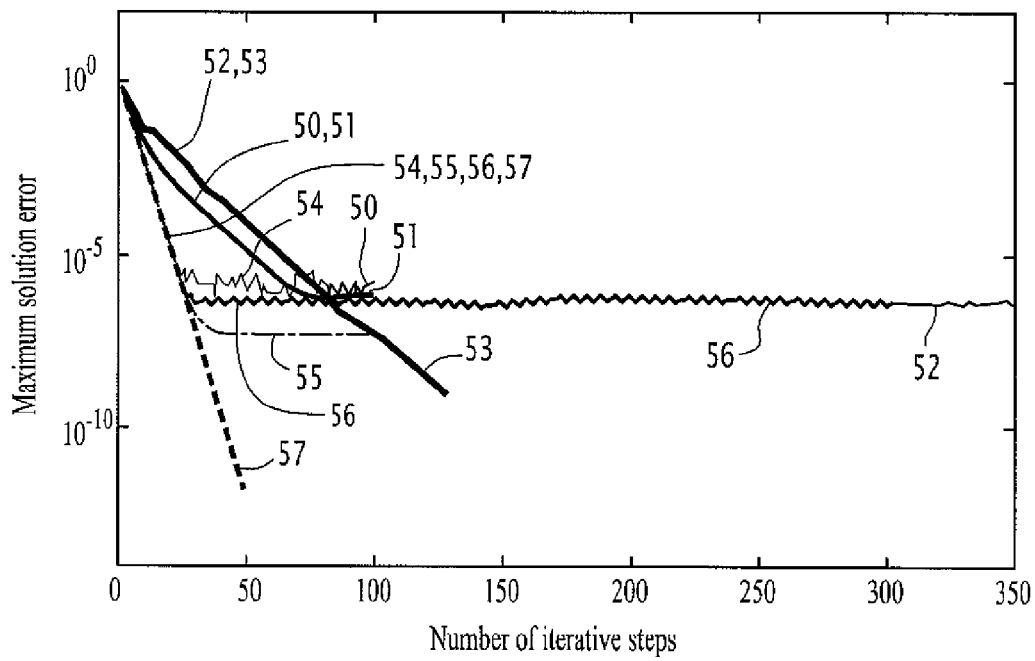
FIG. 7 is a set of convergence curves of eigensystem iterative solving procedures for the state of the art method and different aspects of the method according to the present invention.

FIG. 7 represents a set of convergence curves for different eigensystem iterative solving procedures with the number of pursued NEM iterative steps in abscissa and the fast flux error in ordinate, which is the maximum solution error of the neutron flux for the fast neutrons energy group. Since all energy groups are spectrally coupled, the maximum solution errors of the neutron flux for the other energy groups are quite similar to the fast flux error. Thus, the comparison between different eigensystem iterative solving procedures is possible through these convergence curves.

The curve 50 is the convergence curve for the classic Coarse Mesh Rebalancing (CMR) procedure with use of single precision, and the curve 51 is the convergence curve for the classic CMR procedure with use of double precision. The single and double precisions are the classic precisions used for representing the floating point numbers in a computer program product.

The curve 52 is the convergence curve for the iterative procedure according to the first and the seventh aspects of the present invention for a single energy group with use of single precision, and the curve 53 is the convergence curve for the iterative procedure according to the same aspects of the present invention with use of double precision.

The curve 54 is the convergence curve for the iterative procedure according to the first and the second aspects of the present invention for four coarse energy groups with use of single precision, and the curve 55 is the convergence curve for the iterative procedure according to the same aspects of the present invention with use of double precision.

The curve 56 is the convergence curve for the iterative procedure according to the first, the second and seventh aspects of the present invention for four coarse energy groups with use of single precision, and the curve 57 is the convergence curve for the iterative procedure according to the same aspects of the present invention with use of double precision.

The procedure according to the first, the second and seventh aspects for four coarse energy groups with use of double precision (curve 57) is the procedure with both the smallest error with a value substantially equal to $10^{-13}$ for 50 pursued NEM iteration steps and the best computational efficiency, as illustrated by the gradient of the convergence curves which is maximum for the curve 57.

The procedure according to the first and the seventh aspects for a single energy group with use of double precision (curve 53) also provides a small error with a value substantially equal to $10^{-9}$ for 130 pursued NEM iteration steps. Moreover, the computational efficiency of this procedure (curve 53) is worth than the computational efficiency of the procedure according to the first and the second aspects for four coarse energy groups with use of double precision (curve 55), because the gradient of the curve 55 is greater than the gradient of curve 53.

The procedure according to the first and the second aspects for four coarse energy groups with use of double precision provides an error substantially equal to $10^{-7}$ for 40 pursued NEM iteration steps.

Thus, the double precision has a great effect on the value of the fast flux error, but has no impact on the computational efficiency of the modelizing method.

The seventh aspect of the present invention has also a greater effect on the value of the fast flux error, than on the computational efficiency.

The first and the second aspects for four coarse energy groups provides the best computational efficiency, and FIG. 7 illustrates that the greatest gradient for an error value comprised between $10^0$ and $10^{-5}$ is obtained for the curves 54 to 57, which all correspond to the first and the second aspects.

As set forth in the previous description, the first to eighth aspects of the invention help to achieve robust modelizing methods providing a better computational efficiency so that relevant core simulations can be obtained within short computational time period.

It should be kept in mind that the first aspect in itself helps in achieving this goal and can thus be used separately from the second to eighth aspects. Also, the second, third, seventh and eighth aspects are not necessarily implemented with the first aspect or with any one of the fourth to sixth aspects.

What is claimed is:

1. A computer implemented method for modelizing a nuclear reactor core, comprising the steps of:
partitioning the core in cubes to constitute nodes of a grid for computer implemented calculation,
calculating a neutron flux for the core by using an iterative solving procedure of at least one eigensystem, components of an iterant of the eigensystem corresponding either to a neutron flux, to a neutron outcurrent or to a neutron incurrent, for a respective cube to be calculated,
wherein neutrons are sorted in a plurality of neutron energy groups, and
wherein the iterative solving procedure includes a substep of conditioning the eigensystem into a restricted eigensystem where said neutron energy groups are merged into a smaller number of coarse neutron energy groups,
wherein an iteration of the restricted eigensystem solving procedure is:

$$\underbrace{A_{Gmus}^{(out)} d_{Gmus}^{(out)}}_{\text{"outflow"}} = \mu \left[ \underbrace{\sum_{G'=1}^{NGC} \sum_{u'=1}^{3} \sum_{s'=1,r} Q_{mG}^{G'u's'} d_{G'\eta(mu's')u's'}^{(out)}}_{\text{"isotropic production"}} + \underbrace{\sum_{s'=1,r} C_{Gmus}^{s'} d_{Gmus'}^{(out)}}_{\text{"throughflow"}} \right]$$

wherein $d^{(out)}$ designates the components of the iterant corresponding to an individual cube m; u, u' are Cartesian axis indexes; s, s' are orientations equal to 1 or r and corresponding respectively to a left or a right surface of the individual cube along the respective Cartesian axes u, u'; G, G' being neutron energy groups, A and C being mono-energetic factors, and Q designating a spectral factor, NGC being a number of neutron energy groups in the selection of neutron energy groups, and μ is a neutron eigenvalue,
in which an isotropic term $$\sum_{G'=1}^{NGC} \sum_{u'=1}^{3} \sum_{s'=1,r} Q_{mG}^{G'u's'} d_{G'\eta(mu's')u's'}^{(out)}$$

is independent of an outgoing current direction specified by the Cartesian axis u and orientation s, and a throughflow term $$\sum_{s'=1,r} C_{mGus}^{s'} d_{Gmus'}^{(out)}$$

being defined within the same neutron energy group G along the same Cartesian axis u.

2. The method of claim 1 wherein a number of the plurality of neutron energy groups is equal to 8.

3. The method of claim 1 wherein a number of the selected neutron energy groups is between 1 and 4.

4. The method of claim 1 wherein the iterative solving procedure includes-a multi-level V-cycle, the multi-level V-cycle including a top level, a first intermediate level and at least a bottom level,
   wherein the top level includes the iteration of the eigensystem for the plurality of neutron energy groups and the conditioning of the eigensystem into a restricted eigensystem for the selection of neutron energy groups,
   wherein the first intermediate level includes the conditioning of the restricted eigensystem into a spare eigensystem wherein components of an iterant of the spare eigensystem only correspond either to neutron incurrents coming into the cubes or to neutron outcurrents coming from the cubes, and
   wherein the bottom level includes solving of a first spare eigensystem for a single energy group.

5. The method of claim 4 wherein the multi-level V-cycle also includes at least a second intermediate level,
   wherein each second intermediate level includes, in a downward orientation of the multi-level V-cycle, a conditioning of a former spare eigensystem for a former selection of neutron energy groups into a latter spare eigensystem for a latter selection of neutron energy groups, the number of neutron energy groups in the latter selection being smaller than the number of neutron energy groups in the former selection,
   wherein the former spare eigensystem of the second intermediate level subsequent to the first intermediate level in the downward orientation of the multi-level V-cycle is the spare eigensystem resulting from the first intermediate level, and
   wherein the former spare eigensystem of each second intermediate level which is not subsequent to the first intermediate level is the latter spare eigensystem resulting from a precedent second intermediate level.

6. The method of claim 1 further comprising a step of building a nuclear reactor core on the basis of the calculated neutron flux.

7. The method of claim 1 further comprising operating a nuclear reactor core on the basis of the calculated neutron flux.

8. A computer program product residing on a non-transitory computer readable medium and comprising a computer program for running on a computer the method according to claim 1.

9. A computer implemented method for modelizing a nuclear reactor core, comprising the steps of:
   partitioning the core in cubes to constitute nodes of a grid for computer implemented calculation,
   calculating a neutron flux for the core by using an iterative solving procedure of at least one eigensystem, components of an iterant of the eigensystem corresponding either to a neutron flux, to a neutron outcurrent or to a neutron incurrent, for a respective cube to be calculated,
   wherein neutrons are sorted in a plurality of neutron energy groups, and
   wherein the iterative solving procedure includes a substep of conditioning the eigensystem into a restricted eigensystem where said neutron energy groups are merged into a smaller number of coarse neutron energy groups,
   wherein the iterative solving procedure includes-a multi-level V-cycle, the multi-level V-cycle including a top level, a first intermediate level and at least a bottom level,
   wherein the top level includes the iteration of the eigensystem for the plurality of neutron energy groups and the conditioning of the eigensystem into a restricted eigensystem for the selection of neutron energy groups,
   wherein the first intermediate level includes the conditioning of the restricted eigensystem into a spare eigensystem wherein components of an iterant of the spare eigensystem only correspond either to neutron incurrents coming into the cubes or to neutron outcurrents coming from the cubes, and
   wherein the bottom level includes solving of a first spare eigensystem for a single energy group,
   wherein the multi-level V-cycle also includes at least a second intermediate level,
   wherein each second intermediate level includes, in a downward orientation of the multi-level V-cycle, a conditioning of a former spare eigensystem for a former selection of neutron energy groups into a latter spare eigensystem for a latter selection of neutron energy groups, the number of neutron energy groups in the latter selection being smaller than the number of neutron energy groups in the former selection,
   wherein the former spare eigensystem of the second intermediate level subsequent to the first intermediate level in the downward orientation of the multi-level V-cycle is the spare eigensystem resulting from the first intermediate level, and
   wherein the former spare eigensystem of each second intermediate level which is not subsequent to the first intermediate level is the latter spare eigensystem resulting from a precedent second intermediate level.

10. The method of claim 9 wherein a number of the plurality of neutron energy groups is equal to 8.

11. The method of claim 9 wherein a number of the selected neutron energy groups is between 1 and 4.

12. The method of claim 9 further comprising a step of building a nuclear reactor core on the basis of the calculated neutron flux.

13. The method of claim 9 further comprising operating a nuclear reactor core on the basis of the calculated neutron flux.

14. A computer program product residing on a non-transitory computer readable medium and comprising a computer program for running on a computer the method according to claim 9.

* * * * *